(12) United States Patent
Li (10) Patent No.: US 11,181,952 B2
(45) Date of Patent: Nov. 23, 2021

(54) ELECTRONIC DEVICE

(71) Applicant: Lenovo (Beijing) Co., Ltd., Beijing (CN)

(72) Inventor: Xiaohua Li, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/906,313

(22) Filed: Jun. 19, 2020

(65) Prior Publication Data

US 2020/0401196 A1 Dec. 24, 2020

(30) Foreign Application Priority Data

Jun. 21, 2019 (CN) .......................... 201910540557.7

(51) Int. Cl.
*G06F 1/16* (2006.01)

(52) U.S. Cl.
CPC .......... *G06F 1/1683* (2013.01); *G06F 1/1615* (2013.01); *G06F 1/1656* (2013.01); *G06F 1/1662* (2013.01)

(58) Field of Classification Search
CPC .................................................. G06F 1/1683
See application file for complete search history.

(56) References Cited

U.S. PATENT DOCUMENTS

| | | | | |
|---|---|---|---|---|
| 4,264,962 A * | 4/1981 | Kodaira | ................ | G06F 1/1681 713/321 |
| 4,802,605 A * | 2/1989 | Salmon | ................ | G06F 1/1616 16/267 |
| 4,846,536 A * | 7/1989 | Saitou | ................ | G06F 1/1681 361/679.06 |
| 4,864,523 A * | 9/1989 | Sasaki | ................ | G06F 1/1681 361/679.09 |
| 4,885,430 A * | 12/1989 | Kinser, Jr. | ............ | H01H 13/702 361/749 |
| 4,961,126 A * | 10/1990 | Suzuki | ................ | G06F 1/1616 16/223 |
| 5,196,993 A * | 3/1993 | Herron | ................ | F16M 11/10 248/923 |
| 5,390,075 A * | 2/1995 | English | ................ | G06F 1/1616 16/386 |

(Continued)

FOREIGN PATENT DOCUMENTS

| CN | 1977232 A | 6/2007 |
|---|---|---|
| CN | 103562816 A | 2/2014 |

(Continued)

*Primary Examiner* — Adrian S Wilson
(74) *Attorney, Agent, or Firm* — Anova Law Group, PLLC (57) ABSTRACT

An electronic device includes a first body, a second body, a connection device, a fixed member, a shielding member, and a connection member. The connection device is respectively connected to the first body and the second body, and the first body is rotatable relative to the second body through the connection device. The fixed member is fixed on the first body. The shielding member is rotatably connected to the fixed member, abuts the second body, and has a shielding slot. The connection member is configured to be electrically connected to a first electronic apparatus of the first body and a second electronic apparatus of the second body, and the connection member passes through the shielding slot.

14 Claims, 6 Drawing Sheets

(56) References Cited

U.S. PATENT DOCUMENTS

| | | | | |
|---|---|---|---|---|
| 5,652,694 A | * | 7/1997 | Martin | G06F 1/1616 |
| | | | | 16/223 |
| 5,751,544 A | * | 5/1998 | Song | G06F 1/1616 |
| | | | | 361/679.09 |
| 6,223,393 B1 | * | 5/2001 | Knopf | G06F 1/1618 |
| | | | | 16/366 |
| 6,547,575 B2 | * | 4/2003 | Kato | H01R 35/025 |
| | | | | 439/165 |
| 7,129,931 B2 | * | 10/2006 | Pappas | G06F 1/1601 |
| | | | | 345/168 |
| 2013/0219661 A1 | | 8/2013 | Ge | |
| 2020/0313410 A1 | * | 10/2020 | Xu | H02G 3/0437 |

FOREIGN PATENT DOCUMENTS

| | | |
|---|---|---|
| CN | 103869884 A | 6/2014 |
| CN | 104047952 A | 9/2014 |
| CN | 107168462 A | 9/2017 |
| CN | 108874043 A | 11/2018 |
| CN | 109388191 A | 2/2019 |

* cited by examiner

ELECTRONIC DEVICE

CROSS-REFERENCE TO RELATED APPLICATION

This application claims the priority to Chinese Patent Application Nos. 201910540557.7, entitled "Electronic Device", filed on Jun. 21, 2019, the entire content of which is incorporated herein by reference.

TECHNICAL FIELD

The present disclosure relates to an electronic device.

BACKGROUND

An electronic device often includes a first body, a second body, a connection member, and a connection device that connects the first body and the second body. The connection member is disposed between the first body and the second body. However, during the rotation of the first body relative to the second body through the connection device, most of the connection members between the first body and the second body can be exposed, which affects the appearance and user safety of the electronic device.

SUMMARY

According to one aspect of the present disclosure, an electronic device is provided. The electronic device includes a first body, a second body, a connection device, a fixed member, a shielding member, and a connection member. The connection device is respectively connected to the first body and the second body, and the first body is rotatable relative to the second body through the connection device. The fixed member is fixed on the first body. The shielding member is rotatably connected to the fixed member, abuts the second body, and has a shielding slot. The connection member is configured to be electrically connected to a first electronic apparatus of the first body and a second electronic apparatus of the second body, and the connection member passes through the shielding slot.

Reference numerals: 100, first body; 110, first electronic apparatus; 200, second body; 210, accommodating cavity; 220, opening; 221, first side wall; 222, second side wall; 300, connecting device; 400, fixed member; 410, first shielding part; 420, accommodating slot; 430, snap slot; 431, notch; 500, shielding member; 510, shielding slot; 511, first slot; 512, second slot; 520, second shielding part; 530, first wall part; 540, second wall part; 550, protrusion; 600, connection member.

DETAILED DESCRIPTION OF THE EMBODIMENTS

The technical solution of the present disclosure will be further explained below with reference to the drawings and specific embodiments of the specification. It should be understood that the specific embodiments described herein are only used to explain the present disclosure, and are not used to limit the present disclosure.

In the description of the embodiments of the present disclosure, it should be noted that, unless otherwise stated and limited, the term "connection" should be understood in a broad sense, for example, it may be an electrical connection, or it may be a connection between two components, which may be a direct connection or an indirect connection through an intermediary. For those of ordinary skill in the art, the specific meaning of the above terms can be understood according to specific circumstances.

It should be noted that the term "first/second/third" involved in the embodiments of the present disclosure is only to distinguish among similar objects, and does not represent a specific order of the objects. Understandably, "first/second/third" can allow a specific order or sequence to be exchanged under permissible conditions. It should be understood that the objects distinguished by "first/second/third" may be interchanged where appropriate, so that the embodiments of the present disclosure described herein may be implemented in an order other than those illustrated or described herein.

A transport system described in the embodiments of the present disclosure will be described in detail below with reference to FIGS. 1 to 7.

The embodiments of the present disclosure provide an electronic device. The electronic device includes: a first body 100, a second body 200, a connection device 300, a fixed member 400, a shielding member 500, and a connection member 600. The connection device 300 is connected to the first body 100 and the second body 200, respectively. The first body 100 can rotate relative to the second body 200 through the connection device 300. The fixed member 400 is fixed on the first body 100. The shielding member 500 is rotatably connected to the fixed member 400, the shielding member 500 abuts on the second body 200, and the shielding member 500 has a shielding slot 510. The connection member 600 is configured to electrically connect the first electronic apparatus 110 of the first body 100 with the second electronic apparatus of the second body 200. The connection member 600 passes through the shielding slot 510.

In the embodiments of the present disclosure, the structure of the electronic device is not limited. For example, the electronic device may be a notebook computer, a mobile phone, a game machine, or a learning machine.

In the embodiments of the present disclosure, the structure of the first body 100 is not limited. For example, the first body 100 may be a plate-shaped structure. For example, when the electronic device is a notebook computer, the first body 100 may be a body where a monitor is located.

In the embodiments of the present disclosure, the structure of the second body 200 is not limited. For example, the second body 200 may be a plate-shaped structure. For example, when the electronic device is a notebook computer, the second body 200 may be a body where the keyboard is located.

In the embodiment of the present disclosure, the structure of the connection device 300 is not limited, as long as the first body 100 can rotate relative to the second body 200 through the connection device 300. For example, the connection device 300 may have a rotation shaft structure.

In the embodiments of the present disclosure, the structure of the fixed member 400 is not limited. For example, the fixed member 400 may have a column structure. Here, the implementation to fix the fixed member 400 to the first body 100 is not limited. For example, the fixed member 400 may snap in the first body 100 through a snap structure, or may be attached to the first body 100 by glue.

In the embodiment of the present disclosure, the structure of the shielding member 500 is not limited. For example, the shielding member 500 may be a column structure.

Here, the first body 100 has a first rotation axis with respect to the second body 200, and the fixed member 400 has a second rotation axis with respect to the shielding member 500. There is a first distance between the second rotation axis and the first rotation axis. Accordingly, both the shielding member 500 and the fixed member 400 can be disposed in an area formed by the connection device 300, the shielding member 500 and the fixed member 400 can rotate relative to each other and the fixed member can be connected to the connection member 600 through the shielding member 500, which does not increase the volume of the electronic device. During the rotation of the first body 100 relative to the second body 200, the fixed member 400 rotates relative to the shielding member 500 and the shielding member 500 moves relative to the second body 200. Of course, the first rotation axis and the second rotation axis may also coincide.

The positions of the shielding member 500, the fixed member 400, and the connection device 300 are not limited. For example, the shielding member 500, the fixed member 400, and the connection device 300 are juxtaposed between the first body 100 and the second body 200 along the first rotation axis; that is, the shielding member 500, the fixed member 400 and the connection device 300 are all disposed along the first rotation axis.

The implementation of the rotation connection of the shielding member 500 and the fixed member 400 is not limited.

For example, both the shielding member 500 and the fixed member 400 are provided with connection holes and are respectively inserted into the connection holes of the shielding member 500 and the fixed member 400 through the connection shaft to implement the rotational connection of the shielding member 500 and the fixed member 400.

Figure 4:
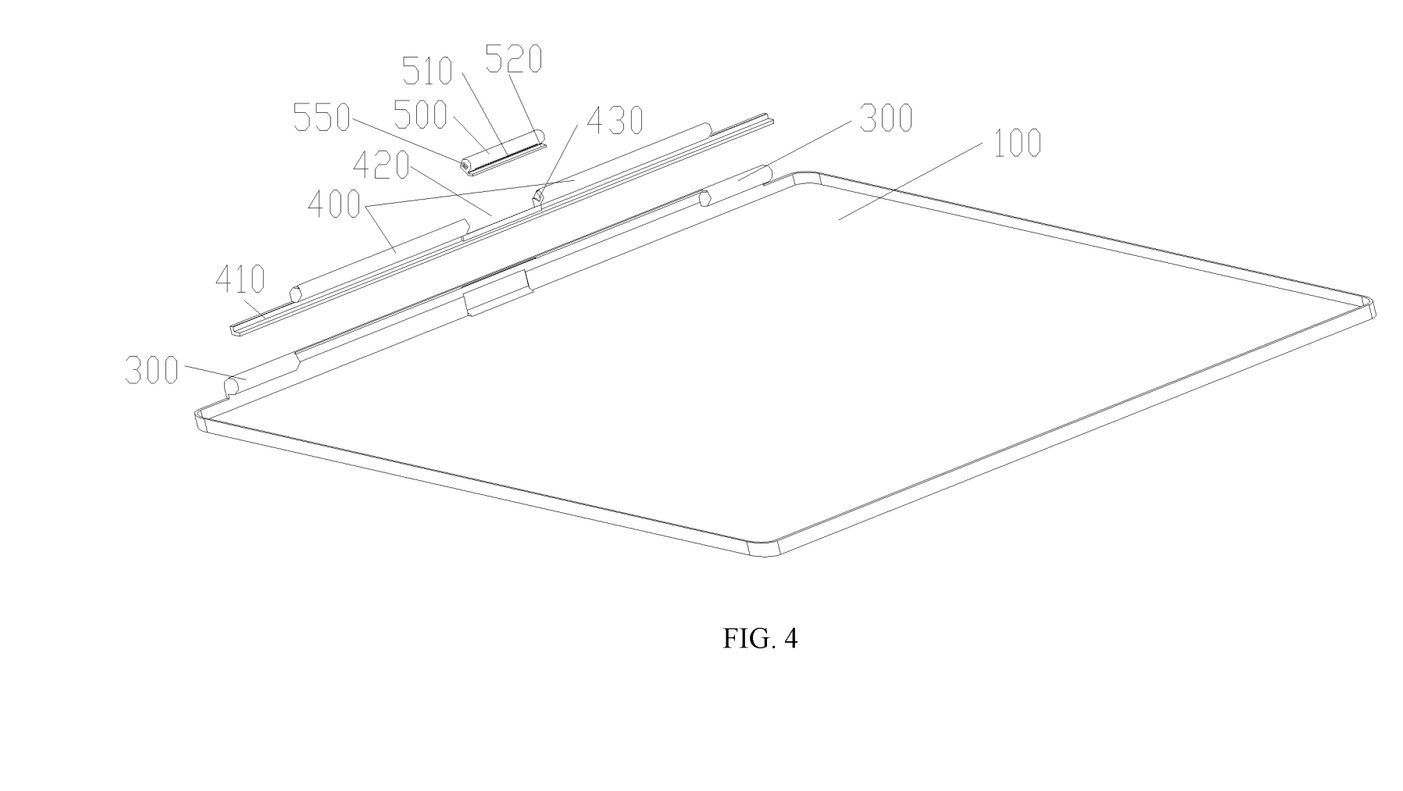
FIG. 4 illustrates an exploded view of a partial structure of the electronic device according to an embodiment of the present disclosure.
Figure 5:
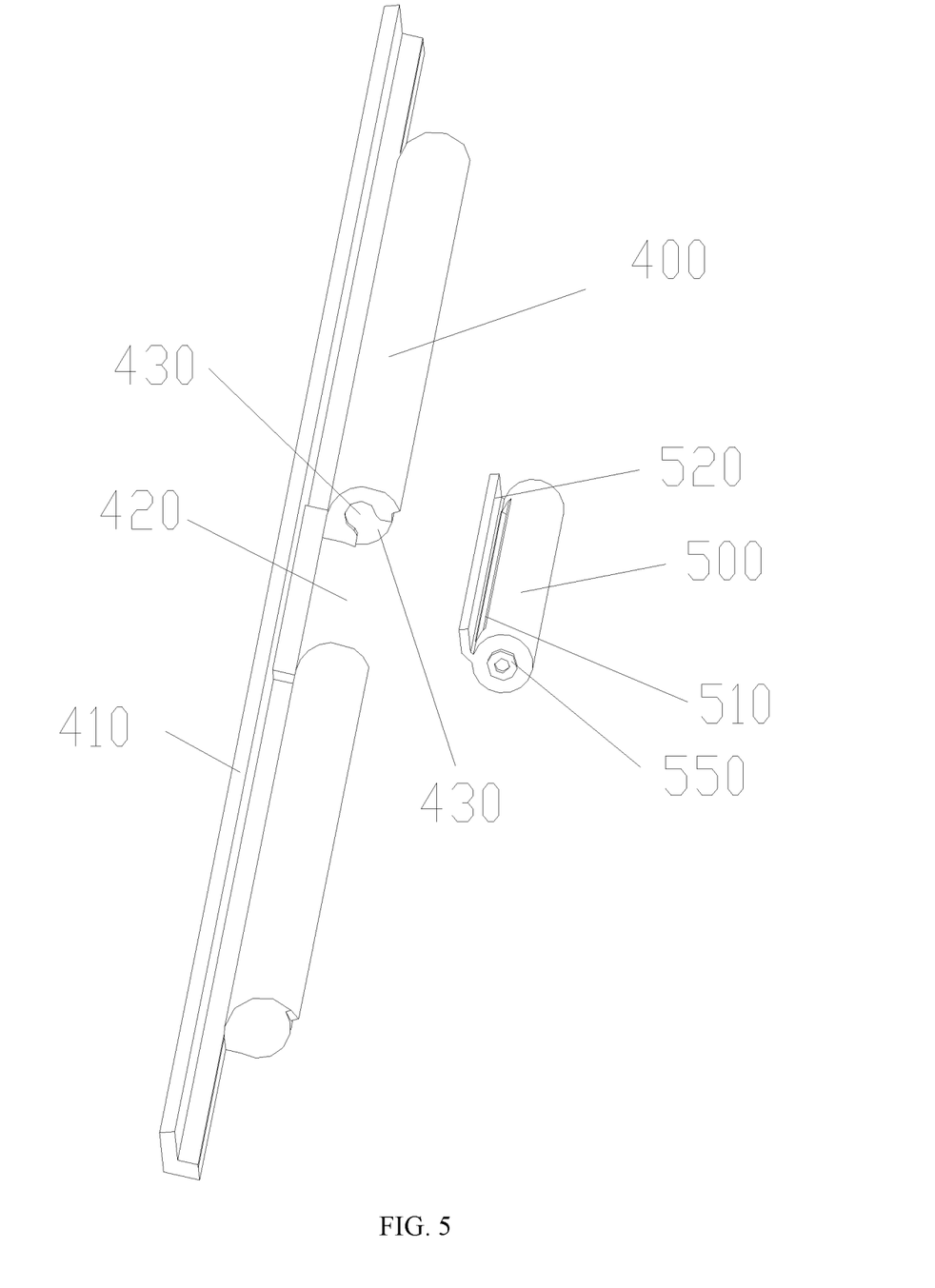
FIG. 5 illustrates another exploded view of the partial structure of the electronic device shown in FIG. 4.

In another example, as shown in FIGS. 4 and 5, the fixed member 400 includes a accommodating slot 420 and two snap slots 430. The two snap slots 430 are disposed on two opposite side walls of the accommodating slot 420. The shielding member 500 includes two protrusions 550. The two protrusions 550 are disposed on two opposite sides of the shielding member 500, the two protrusions 550 are respectively inserted into the two snap slots 430, and the two protrusions 550 can rotate relative to the two snap slots 430. That is, a first protrusion 550 of the two protrusions 550 is inserted into a first snap slot 430 of the two snap slots 430, and a second protrusion 550 of the two protrusions 550 is inserted into a second snap slot 430 of the snap slots 430. In the two snap slots 430, the first protrusion 550 can rotate in the first snap slot 430, and the second protrusion 550 can rotate in the second snap slot 430. When the first body 100 rotates relative to the second body 200, the fixed member 400 rotates relative to the two protrusions 550 through the two snap slots 430 to rotate relative to the shielding member 500.

The implementation of inserting the two protrusions 550 respectively into the two snap slots 430 are not limited. For example, as shown in FIG. 5, the slot 430 is further provided with a notch 431, a width of the notch 431 is smaller than a width of the protrusion 550, and the two protrusions 550 are pressed through the notch 431 by external force and inserted into the two snap slots 430.

The structure of the shielding slot 510 is not limited. For example, as shown in FIGS. 1 and 5, the shielding member 500 has a cylindrical structure, and the shielding slot 510 is a through slot disposed in a radial direction of the shielding member 500.

In the embodiments of the present disclosure, the connection member 600 is configured to electrically connect the first electronic apparatus 110 of the first body 100 and the second electronic apparatus of the second body 200. The structure of the connection member 600 is not limited. For example, the connection member 600 may be a connection wire. In another example, the connection member 600 may also be a flexible printed circuit (FPC).

The structures of the first electronic apparatus 110 and the second electronic apparatus are not limited. For example, the electronic device may be a notebook computer, the first electronic apparatus 110 may be a monitor, and the second electronic apparatus may be a processor.

Figure 1:
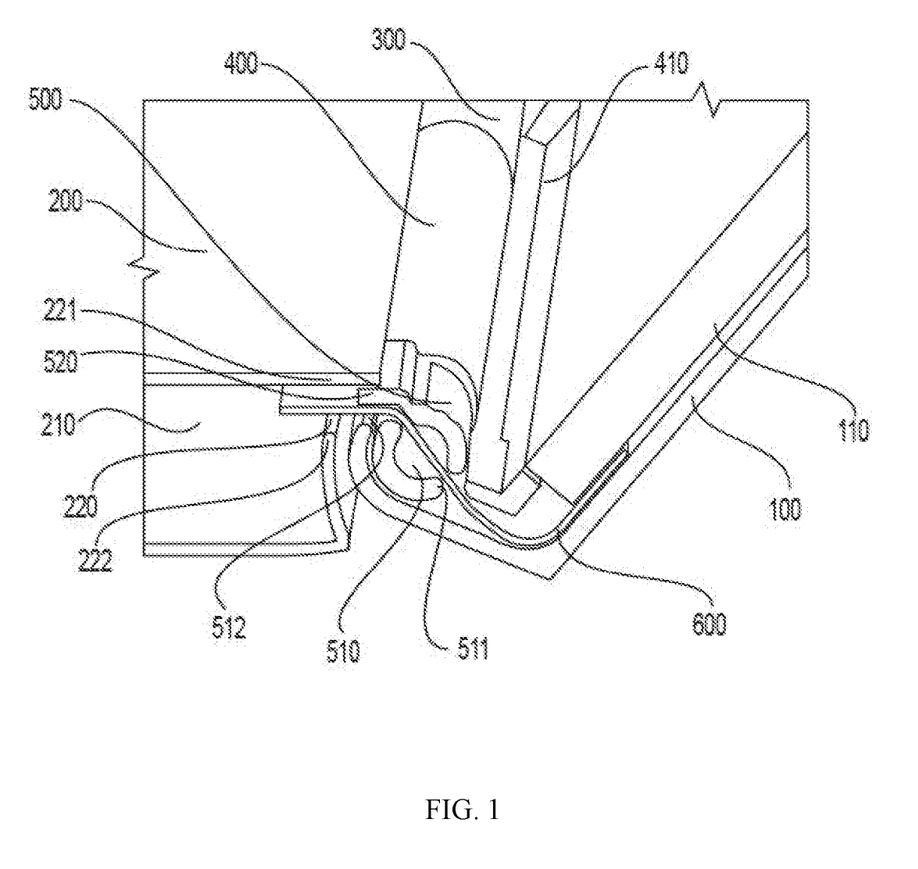
FIG. 1 is a schematic diagram of a partial structure of an electronic device according to an embodiment of the present disclosure.

In some optional implementations of the embodiments of the present disclosure, as shown in FIG. 1, the first electronic apparatus 110 is disposed on a first side of the first body 100. The fixed member 400 includes: a first shielding part 410. The first shielding part 410 is located on a first side of the first body 100, the first shielding part 410 is adjacent to the first electronic apparatus 110, and a first shielding channel is formed between the first shielding part 410 and the first side of the first body 100. A first end of the connection member 600 is electrically connected to the first electronic apparatus 110 through the first slot 511 of the shielding slot 510 and the first shielding channel.

In this implementation, since the connection member 600 passes through the first shielding channel, the first shielding part 410 can shield the connection member 600, thereby improving the appearance of the electronic device, and the first shielding channel can also protect the connection member 600, thereby improving the safety of electronic device.

Figure 2:
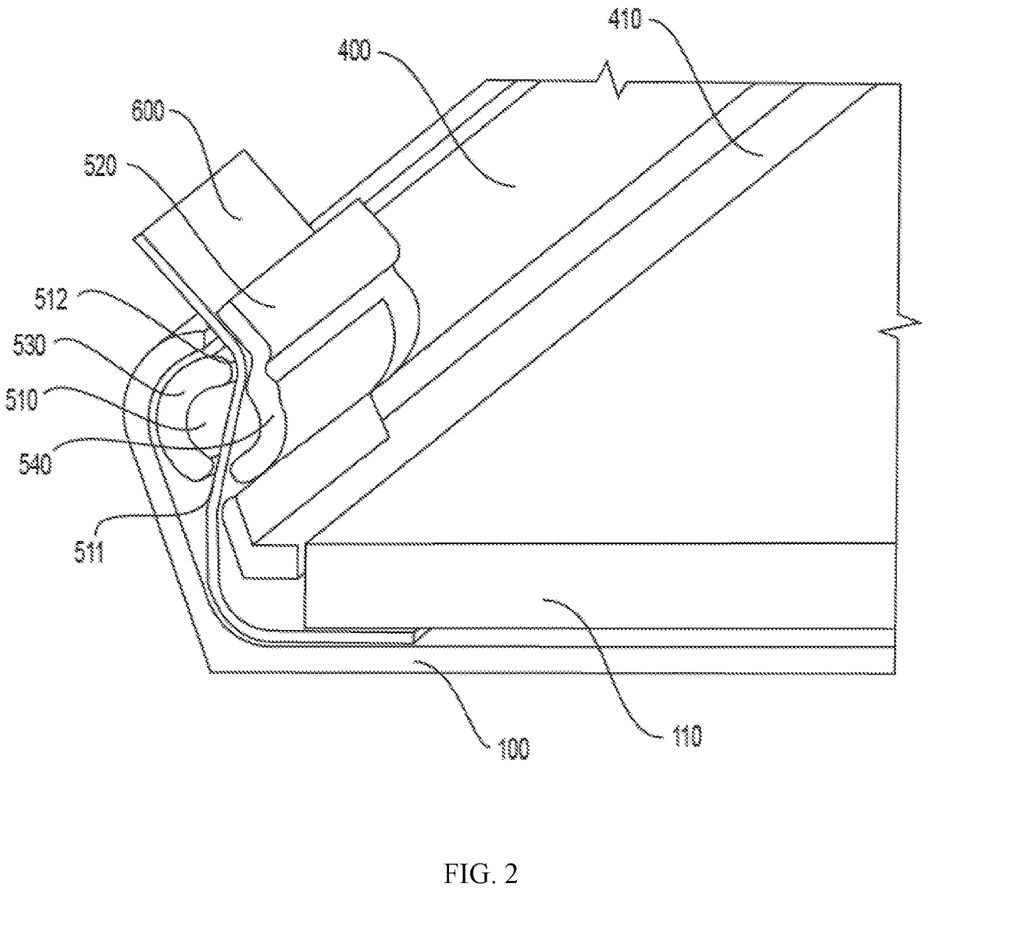
FIG. 2 is a schematic diagram of another partial structure of the electronic device according to an embodiment of the present disclosure.

In this implementation, the structure of the first shielding part 410 is not limited. For example, the first shielding part 410 may be a plate-shaped structure. In another example, as shown in FIG. 2, the first shielding part 410 may include: a first portion and a second portion. An angle is formed between the first portion and the second portion, and the first portion and the second portion form an L-shaped structure. An outer surface of the first portion is flush with an outer surface of the first electronic apparatus 110, and the outer surface of the first portion and the outer surface of the first electronic apparatus 110 form an outer surface of the electronic device. The second portion is adjacent to the shielding member 500.

In this implementation, the first shielding part 410 is adjacent to the first electronic apparatus 110 so that the first shielding part 410 can abut the first electronic apparatus 110, or a first gap can be formed between the first shielding part 410 and the first electronic apparatus 110.

In this implementation, a partial outer surface of the first shielding part 410 is flush with the outer surface of the first electronic apparatus 110, and the partial outer surface of the first shielding port 410 and the outer surface of the first electronic apparatus 110 form the outer surface of the electronic device.

Figure 3:
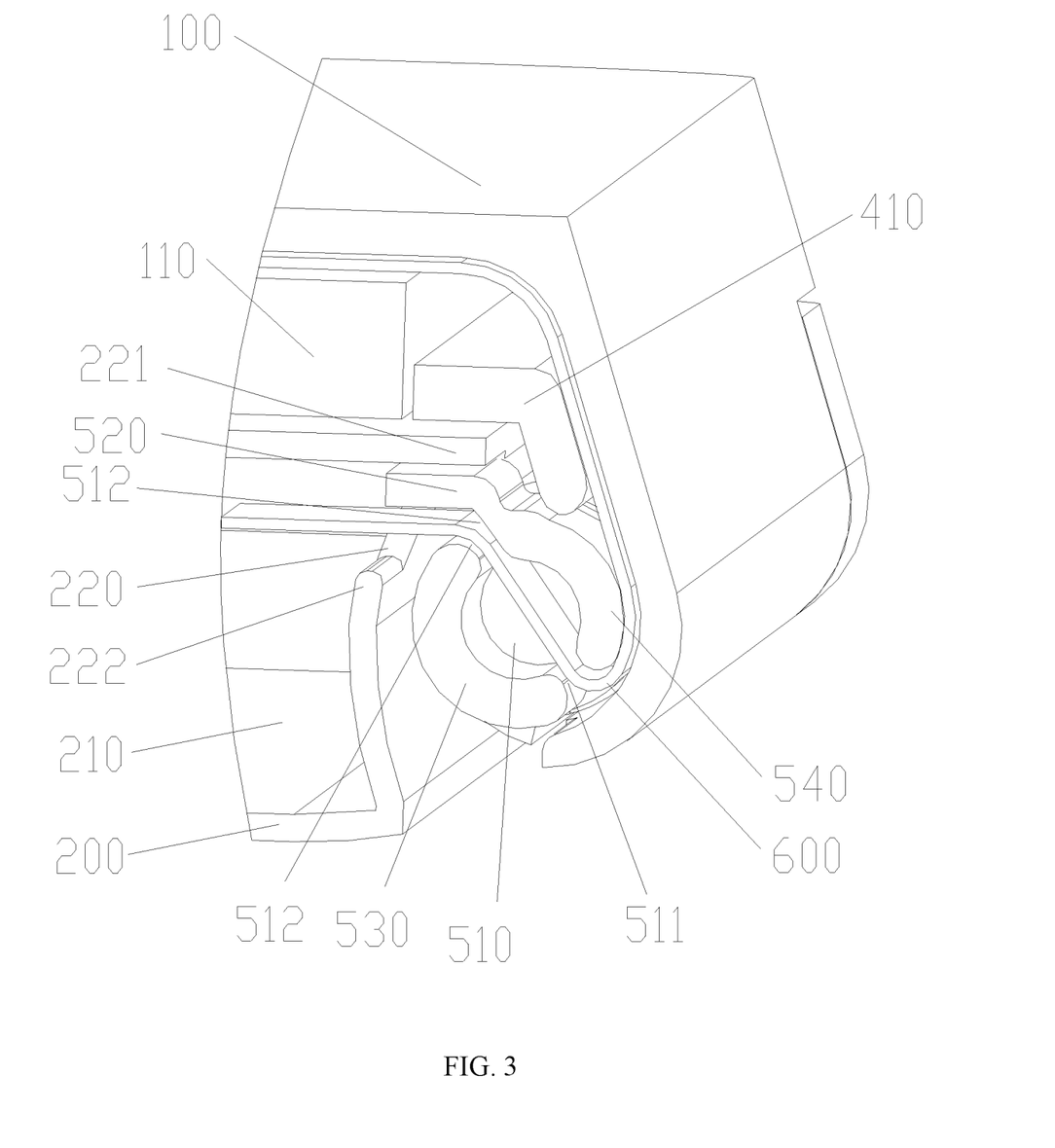
FIG. 3 is a schematic diagram of another partial structure of the electronic device according to an embodiment of the present disclosure.

In some optional implementations of the embodiments of the present disclosure, as shown in FIGS. 1 and 3, the second body 200 may include: a accommodating cavity 210 and an opening 220. The opening 220 is connected to the accommodating cavity 210, and the opening 220 corresponds to position of the second slot 512 of the shielding slot 510. The shielding member 500 may include: a second shielding part 520. The second shielding part 520 is disposed at the second slot 512, the second shielding part 520 abuts an inside of a first side wall 221 of the opening 220, and a second shielding channel is formed between the second shielding part 520 and a second side wall 222 of the opening 220. A second end of the connection member 600 is electrically connected to the second electronic apparatus of the accommodating cavity 210 through the second slot 512 and the second shielding channel.

In this implementation, since the connection member 600 passes through the second shielding channel, the second shielding part 520 can shield the connection member 600, thereby improving the appearance of the electronic device. The second shielding channel can also protect the connecting member 600, thereby improving the safety of electronic device.

In this implementation, the position of the opening 220 is not limited. For example, the opening 220 may be located at the side of the second body 200 near the first body 100.

In this implementation, the structure of the second shielding part 520 is not limited. For example, as shown in FIGS. 1 and 5, the second shielding part 520 may have a plate-shaped structure. The second shielding part 520 may be disposed at the side wall of the second slot 512 away from the side of the first body 100.

In some optional implementations of the embodiments of the present disclosure, as shown in FIGS. 1 to 3, the shield 500 may include: a first wall part 530 and a second wall part 540. The first wall part 530 is adjacent to the first body 100; the second wall part 540 abuts the second body 200, and the shielding slot 510 is formed between the second wall part 540 and the first wall part 530. A first end of the second wall part 540 and a first end of the first wall part 530 form the first slot 511, and a second end of the second wall part 540 and a second end of the first wall part 530 form the second slot 512. The first end of the connection member 600 is electrically connected to the first electronic apparatus 110 through the first slot 511, and the second end of the connection member 600 is electrically connected to the second electronic apparatus through the second slot 512.

In this implementation, the structure of the first wall 530 is not limited. For example, as shown in FIGS. 1 to 3, the cross-sectional shape of the first wall part 530 may be a partial ring.

The first wall part 530 is adjacent to the first body 100 so that the first wall part 530 can abut the first body 100, or a gap can be formed between the first wall part 530 and the first body 100.

In this implementation, the structure of the second wall 540 is not limited. For example, as shown in FIGS. 1 to 3, the cross-sectional shape of the second wall part 540 may be a partial ring. The second wall part 540 and the first wall part 530 form a structure having a cross-section being a circular shape. The junction of the second wall part 540 and the first wall part 530 forms the first slot 511 and a second slot 512.

In this implementation, the position of the first slot 511 is not limited.

For example, as shown in FIG. 1, the first slot 511 may be near the first side of the first body 100, the first shielding part 410 of the fixed member 400 may be shielded from the first slot 511, and the first slot 511 may be in a hidden state. That is, during the rotation of the first body 100 relative to the second body 200, the first body 100 and the first shielding part 410 may constantly shield the first slot 511, and the first slot 511 may remain unexposed. Accordingly, the connection member 600 led from the first slot 511 may remain hidden, thereby improving the appearance of the electronic device, and the first shielding part 410 can protect the connection member 600, thereby improving the safety of the electronic device.

The first shielding part 410 has been described above, and will not be repeated here.

In the implementation, the position of the second slot 512 is not limited.

For example, the second slot 512 may be located near the side of the second body 200; the shielding member 500 may further include a second shielding part 520. The second shielding part 520 is connected to the second end of the second wall part 540, and the second shielding part 520 abuts the second body 200. The second end of the connection member 600 passes through the second slot 512, being electrically connected to the second electronic apparatus along the second shielding part 520.

The second shielding part 520 and the second electronic apparatus have been described above, and will not be repeated here.

Figure 6:
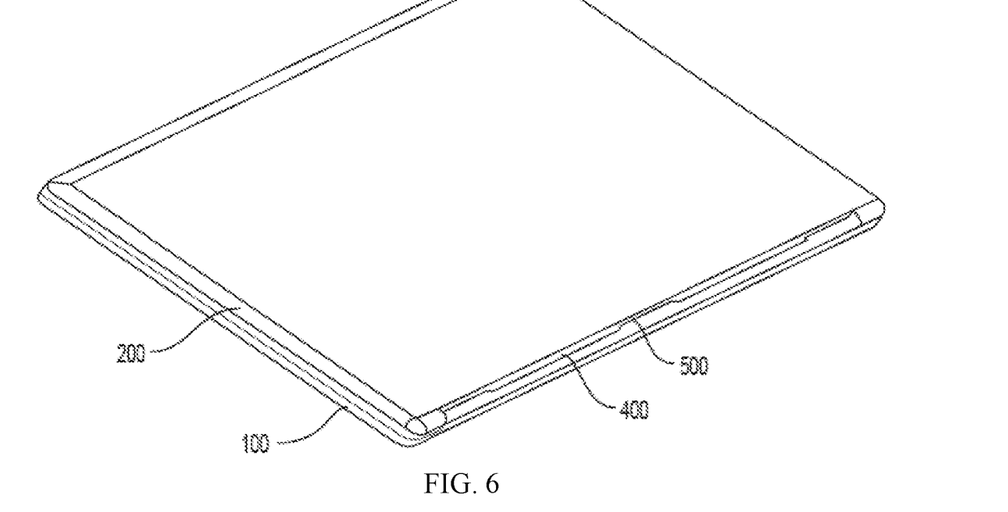
FIG. 6 is a schematic structural diagram of the electronic device according to an embodiment of the present disclosure.
Figure 7:
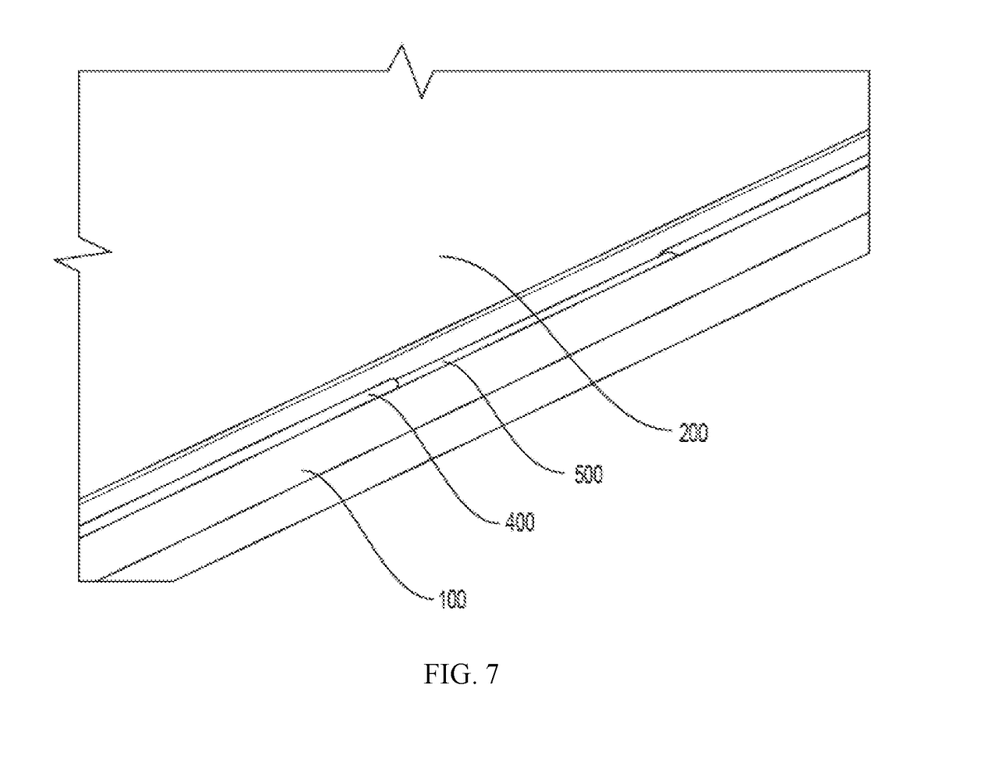
FIG. 7 is a schematic diagram of the structure of the electronic device according to an embodiment of the present disclosure.

In this implementation, in a state where the first body 100 rotates to a first limit position relative to the second body 200, as shown in FIGS. 3 and 6, the first side of the first body 100 fit to a second side of the second body 200. The first wall part 530 is exposed in the gap between the first body 100 and the second body 200, and a wire arrangement channel is formed between the second wall part 540 and the first body 100. The first end of the connection member 600 passes through the first notch 511, the wire arrangement channel, and the first shielding channel to be connected to the first electronic apparatus 110. At this time, the second wall part 540, the first shielding part 410, and the second shielding part 520 are in a hidden state. The first wall part 530 can shield the connection member 600, and the connection member 600 is in a hidden state, as shown in FIGS. 6 and 7. In a state where the first body 100 rotates to a second limit position relative to the second body 200, as shown in FIG. 1, a first angle is formed between the first body 100 and the second body 200. The second wall part 540, the first shielding part 410, and the second shielding part 520 are exposed, and the first end of the connection member 600 passes through the first slot 511 and the first shielding channel to be electrically connected to the first electronic apparatus 110. At this time, the second wall part 540 is far away from the first body 100, and no wire arrangement channel is formed between the first body 100 and the first body 100. The second wall part 540, the first shielding part 410, and the second shielding part 520 jointly shield the connection member 600, and the connection member 600 is in a hidden state.

The first shielding channel is the channel formed between the first shielding part 410 and the first side of the first body 100. The first shielding channel has been described above and will not be repeated here.

During the rotation of the first body 100 relative to the second body 200, the connection member 600 remains hidden, thereby improving the appearance of the electronic device, and the connection member 600 can be protected, thereby improving the safety of the electronic device.

In the embodiments of the present disclosure, the connection member 600 passes through the shielding slot 510, and a part of the connection member 600 is hidden in the shielding slot 510, which can prevent most of the connection member 600 from being exposed, thereby improving the appearance of the electronic device. And the shielding slot 510 can also protect the connection member 600 between the first body 100 and the second body 200, thereby improving the safety of the electronic device.

The above descriptions are only specific embodiments of the present disclosure, but not to limit the scope of the disclosure. Any variations or substitutions within the technical scope disclosed by the present disclosure that any person skilled in the art can easily think of should be covered by the scope of the disclosure. Therefore, the scope of the disclosure should conform to the scope of the appended claims.

What is claimed is:

1. An electronic device, comprising:
a first body;
a second body;
a connection device respectively connected to the first body and the second body, the first body being rotatable relative to the second body through the connection device;
a fixed member fixed on the first body;
a shielding member rotatably connected to the fixed member, abutting the second body, and having a shielding slot; and
a connection member configured to be electrically connected to a first electronic apparatus of the first body and a second electronic apparatus of the second body, the connection member passing through the shielding slot, wherein:
the first electronic apparatus is disposed at a first side of the first body; and
the fixed member comprises a first shielding part located on the first side of the first body, being adjacent to the first electronic apparatus, a first shielding channel being formed between the first shielding part and the first side of the first body, and a first end of the connection member being electrically connected to the first electronic apparatus through a first slot of the shielding slot and the first shielding channel.

2. The electronic device according to claim 1, wherein:
the second body comprises:
an accommodating cavity; and
an opening connected to the accommodating cavity, corresponding to a position of
of a second slot of the shielding slot; and
the shielding member comprises:
a second shielding part disposed at the second slot, abutting inside of a first side wall of the opening, a second shielding channel being formed between the second shielding part and a second side wall of the opening, and a second end of the connection member being electrically connected to the second electronic apparatus of the accommodating cavity through the second slot and the second shielding channel.

3. The electronic device according to claim 1, wherein:
the first body has a first rotation axis with respect to the second body, the fixed member has a second rotation axis with respect to the shielding member, and there is a first distance between the second rotation axis and the first rotation axis.

4. The electronic device according to claim 3, wherein:
during the rotation of the first body relative to the second body, the fixed member rotates relative to the shielding member and the shielding member moves relative to the second body.

5. An electronic device, comprising:
a first body;
a second body;
a connection device respectively connected to the first body and the second body, the first body being rotatable relative to the second body through the connection device;
a fixed member fixed on the first body;
a shielding member rotatably connected to the fixed member, abutting the second body, and having a shielding slot; and
a connection member configured to be electrically connected to a first electronic apparatus of the first body and a second electronic apparatus of the second body, the connection member passing through the shielding slot, wherein:
the shielding member comprises:
a first wall part adjacent to the first body; and
a second wall part abutting the second body, a shielding slot being formed between the second wall part and the first wall part; a first end of the second wall part and a first end of the first wall part forming a first slot, and a second end of the second wall part and a second end of the first wall part forming a second slot; and
a first end of the connection member is electrically connected to the first electronic apparatus through the first slot, and the second end of the connection member is electrically connected to the second electronic apparatus through the second slot.

6. The electronic device according to claim 5, wherein:
the first slot is located near a first side of the first body; a first shielding part of the fixed member shields the first slot, and the first slot is in hidden.

7. The electronic device according to claim 6, wherein:
the second slot is located near the second body; and
the shielding member further comprises:
a second shielding part connected to the second end of the second wall part, abutting the second body, the second end of the connection member passing through the second slot to be electrically connected to the second electronic apparatus along the second shielding part.

8. The electronic device according to claim 7, wherein:
in response to the first body rotating to a first limit position relative to the second body, the first side of the first body fits to the second side of the second body, the first wall part is exposed in a gap between the first body and the second body, a wire arrangement channel is formed between the second wall part and the first body, and the first end of the connection member passes through the first slot, the wire arrangement channel and the first shielding channel to be electrically connected to the first electronic apparatus, the first shielding channel being formed between the first shielding part and the first side of the first body; and in response to the first body rotating to a second limit position relative to the second body, a first angle is formed between the first body and the second body; the second wall part, the first shielding part and the second shielding part are exposed; and the first end of the connection member passes through the first slot and the first shielding channel to be electrically connected to the first electronic apparatus.

9. An electronic device, comprising:

a first body;

a second body;

a connection device respectively connected to the first body and the second body, the first body being rotatable relative to the second body through the connection device;

a fixed member fixed on the first body;

a shielding member rotatably connected to the fixed member, abutting the second body, and having a shielding slot; and a connection member configured to be electrically connected to a first electronic apparatus of the first body and a second electronic apparatus of the second body, the connection member passing through the shielding slot, wherein:

the fixed member comprises:
  an accommodating slot; and
  two snap slots disposed at two opposite side walls of the accommodating slot; and the shielding member comprises:
  two protrusions disposed at two opposite sides of the shielding member, being respectively inserted into the two snap slots and being rotatable relative to the two snap slots; and in response to the first body rotating relative to the second body, the fixed member rotates relative to the shielding member through the rotation of the two snap slots relative to the two protrusions.

10. The electronic device according to claim 1, wherein: the electronic device is a notebook computer having a monitor in the first body and a keyboard in the second body.

11. The electronic device according to claim 1, wherein: the connection device has a rotation shaft structure.

12. The electronic device according to claim 1, wherein: the fixed member is attached to the first body by glue.

13. The electronic device according to claim 1, wherein: the connection member is a connection wire or a flexible printed circuit (FPC).

14. The electronic device according to claim 1, wherein: the first electronic apparatus is a monitor and the second electronic apparatus is a processor.

* * * * *